No. 626,895. Patented June 13, 1899.
J. B. FONDU.
MANUFACTURE OF GLASS TUMBLERS.
(Application filed Dec. 23, 1898.)

(No Model.) 3 Sheets—Sheet 1.

WITNESSES:
Wm D. Bell.
Robert J. Pollitt.

INVENTOR
Jean Baptiste Fondu
BY
Gartner & Steward
ATTORNEYS

THE NORRIS PETERS CO., PHOTO-LITHO., WASHINGTON, D. C.

No. 626,895. Patented June 13, 1899.
J. B. FONDU.
MANUFACTURE OF GLASS TUMBLERS.
(Application filed Dec. 23, 1898.)

(No Model.) 3 Sheets—Sheet 3.

WITNESSES: INVENTOR
Wm. D. Bell. Jean Baptiste Fondu
Robert J. Pollitt. BY
Bartner & Stevens
ATTORNEYS

UNITED STATES PATENT OFFICE.

JEAN BAPTISTE FONDU, OF BRUSSELS, BELGIUM.

MANUFACTURE OF GLASS TUMBLERS.

SPECIFICATION forming part of Letters Patent No. 626,895, dated June 13, 1899.

Original application filed February 12, 1898, Serial No. 674,061. Divided and this application filed December 23, 1898. Serial No. 700,117. (No model.)

*To all whom it may concern:*

Be it known that I, JEAN BAPTISTE FONDU, a subject of the King of Belgium, residing in Brussels, in the Kingdom of Belgium, have invented certain new and useful Improvements in the Manufacture of Glass Tumblers; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The invention herein referred to constitutes a division of the subject-matter referred to in an application for Letters Patent filed by me in the United States Patent Office February 12, 1898, Serial No. 674,061.

The invention relates to the manufacture of glass tumblers, and it has reference particularly to a machine for cleaning, planing off, and polishing the bottoms of the blown tumblers.

The invention consists in the improved machine for cleaning, planing off, and polishing the bottoms of the blown tumblers and in the combination and arrangement of the various parts, substantially as will be hereinafter described and finally embodied in the clauses of the claim.

The invention is fully illustrated in the accompanying drawings, wherein like numerals of reference indicate corresponding parts in the several figures, and in which—

Figure 1:
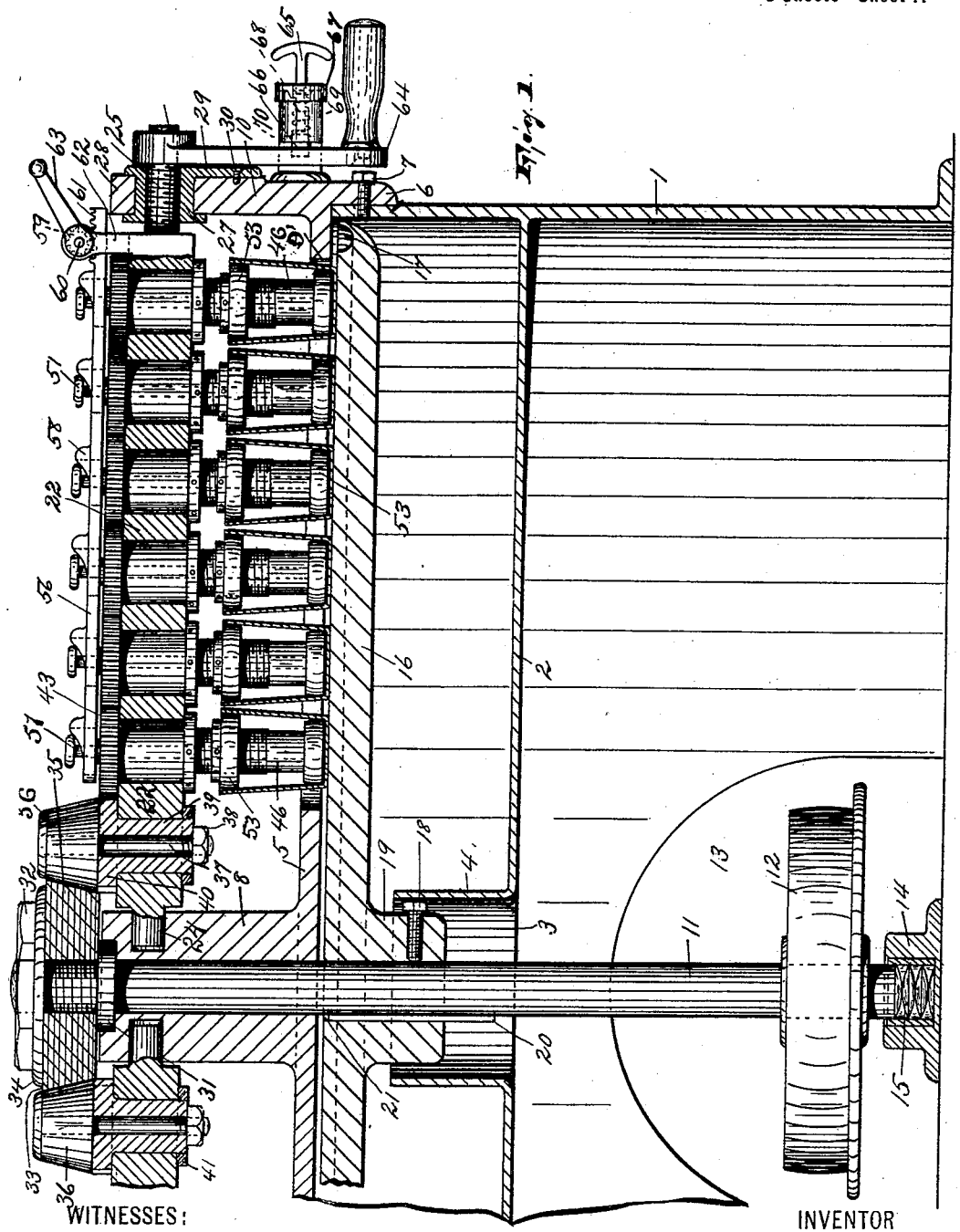
Figure 2:
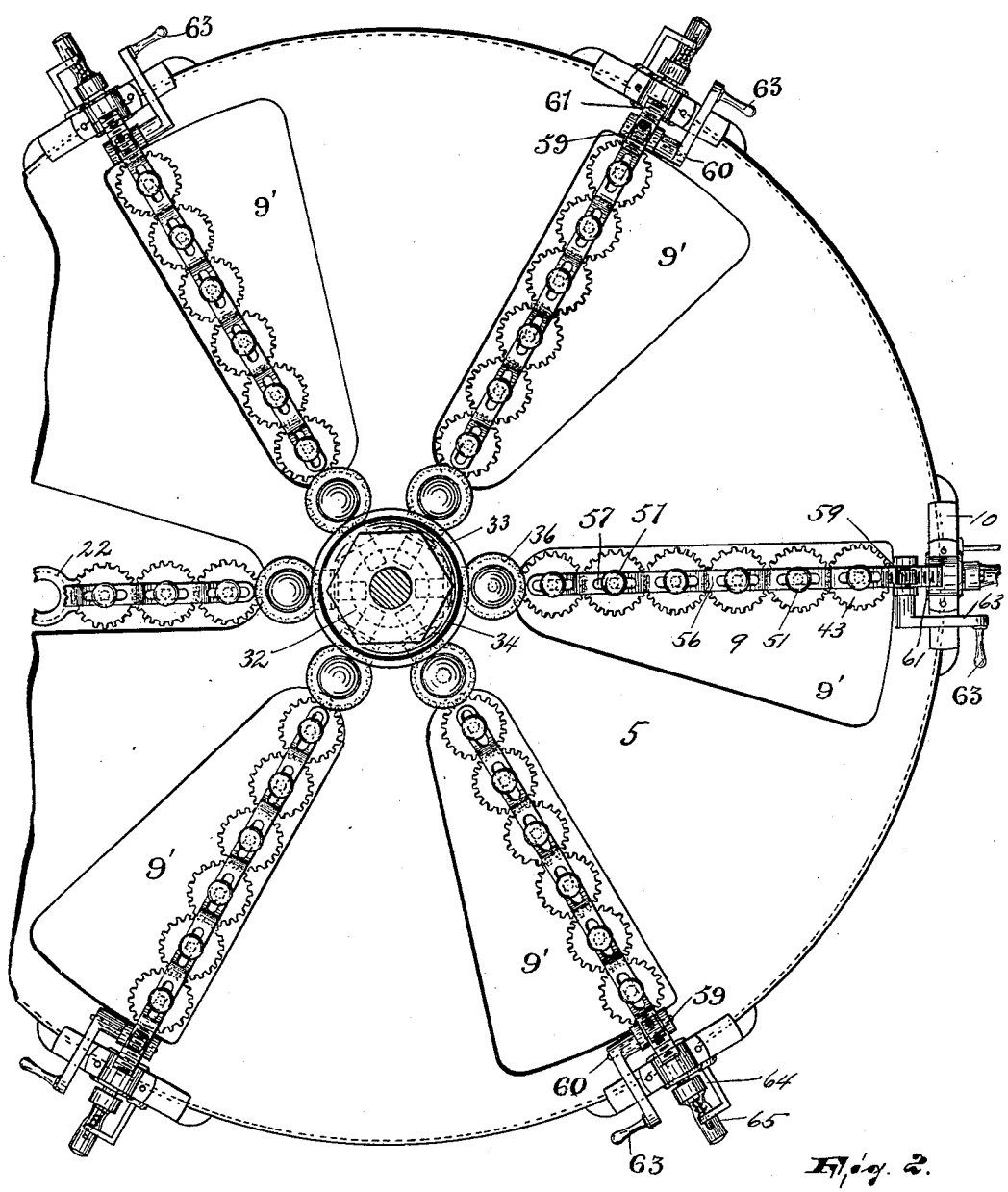
Figure 3:
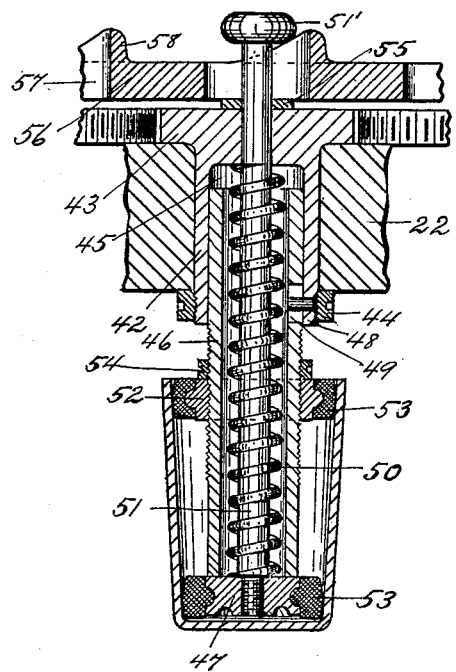
Figure 4:
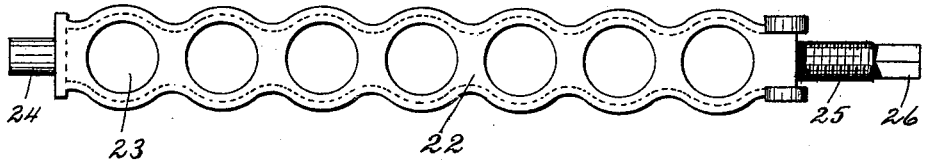
Figure 5:
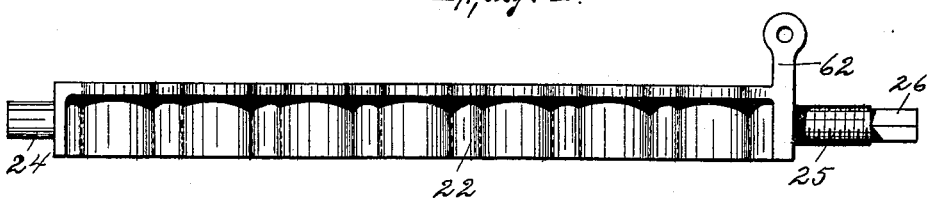

Figure 1 is a vertical sectional view of a portion of the machine constituting the subject-matter of this invention, enough being shown to sufficiently illustrate the construction thereof. Fig. 2 is a top plan view of said machine, a portion thereof being broken away. Fig. 3 is an enlarged vertical sectional view of one of the details of the machine, illustrating the tumbler-holding means; and Figs. 4 and 5 are top plan and side views, respectively, of a certain tumbler-supporting frame of the machine.

The base of the machine is designated by the numeral 1 and consists of a substantially circular chamber, which is divided near its upper edge by a partition 2, having a central aperture 3, that is surrounded by an integral upwardly-extending flange 4 upon said partition. Supported upon said base is a plate 5, having a surrounding downwardly-extending flange 6, which is secured to the base 1 in any suitable manner, as by bolts 7. Said plate 5 is furthermore provided at the center with an upwardly-extending boss 8 and projecting from the center a series of radial orifices 9. At the outer end of each orifice and extending upwardly from the edge of said plate is a bracket 10. Penetrating said boss 8 and having bearings therein and extending through the flange 4 of the partition 2 is a vertical shaft 11, carrying a belt-wheel 12, the belt for operating which is adapted to extend through an opening 13 in the wall of the base. Said shaft is stepped in a block 14, wherein it rests upon a series of convex disks 15. The shaft carries a disk 16, having in its upper face and near its periphery an annular recess or channel 17, and it is adjustably mounted on said shaft by a set-screw 18, which is situated in a downwardly-extending hub 19 upon said disk. The disk is keyed to the shaft by means of a feather 20, mounted upon the latter and projecting into a slot 21 in the hub. Projecting radially from said boss 8 is a series of carriers, each of which consists of a frame 22, having several openings 23, arranged longitudinally thereof, and having at its inner extremity a bearing 24, projecting into said boss, and at its outer extremity a threaded bearing 25, whose free end 26 is squared. The threaded bearing 25 projects through a flanged block 27, loosely mounted, so as to be susceptible of being turned or rotated upon the bracket 10 and held in place by a yoke 28, bolted to the bracket. The block is provided with internal threading, with which the threading of the bearing which it receives engages. The block is adapted when rotated to effect the adjustment radially of the frame 22, and in order to facilitate its operation it is provided with an extension 29, carrying a removable screw 30, which may be set into said extension and screwed into the bracket.

The shaft 11 has near its upper end a surrounding integral annulus 31, between which and a nut 32, that is screwed on the shaft, is a friction-cone 33, surmounted by a washer 34 and consisting of a series of leather disks 35 in laminated arrangement. The friction-cone 33 is in operative contact with a series of smaller friction-cones 36, surrounding it and each journaled in a frame 22 and near the inner end of the latter. Each smaller friction-cone 36 has a downwardly-projecting pin or bolt 37, between the nut 38 at the free end of which and said cone is secured a sleeve 39, the upper end of which is provided with a flange 40, formed into and being also a pinion. The sleeve 39 extends through the innermost orifice of the frame 22, and it is prevented from removal upwardly by a nut 41, screwed upon its lower end and provided with peripheral spanner-holes. In each of the remaining orifices 23 of each frame 22 is journaled a sleeve 42, having at its upper end a combined supporting-flange and pinion 43, each pinion being in engagement with its neighbor. Each sleeve 42 is provided at its lower end with a spanner-nut 44, that has a function similar to the corresponding element for the sleeve 39.

Into the bore 45 of each sleeve 42 projects the upper end of a tube 46, having an annular block 47 at its lower end and guided for longitudinal movement in said sleeve by a pin 48, projecting through the latter and engaging a vertical slot 49 in said tube. Between the upper wall of the bore 45 and the annular block 47 is a helical spring 50, which is penetrated by a vertical spindle 51, screwed into the annular block 47 at its lower end and having a rounded head 51' at its upper end. The annular block 47 and a ring 52, that is screwed onto the tube 46 above said block, are surrounded each by an elastic cushion 53, having a tongue-and-grooved connection with the surrounded element. A binding-nut 54 may be screwed upon the tube 46 above the ring 52, so as to retain the latter securely in the desired position.

Extending longitudinally of each frame 22 and resting upon suitable spacing-washers 55, each of which is penetrated by a spindle 51, is a longitudinally-movable elongated bar 56, provided with vertical openings 57 for the admission of the spindles 51, and having partially surrounding each opening a cam 58, adapted to act against the under side of the head 51' to raise the same and the spindle. The longitudinal movements of the bar are effected by means of a pinion 59, mounted upon the end of a small shaft 60 and engaging rack-teeth 61 upon said bar, said shaft being journaled in uprights 62 on the frame and having a crank 63.

64 indicates a crank provided with a suitable handle and mounted upon the squared end 26 of the bearing 25 of each frame, and 65 designates a bolt whose inner end 66 is adapted to engage a suitable recess in the crank, said bolt being arranged in a bracket 67 and controlled by a spring 68, disposed between a portion of the bracket and in a sleeve 69 thereof and an enlargement 70 on the bolt.

The operation of the machine may be described as follows: When the shaft is rotated, a rotary movement is imparted through the friction-cones and through the train of pinions to each sleeve 42 and the cushioned tube suspended therefrom, the disk 16 moving around with the shaft. Hence having previously placed a tumbler upon each of the holders which the cushioned tube constitutes the rotary movements above described will not only effect an individual rotation of each tumbler, but will also effect a movement of the disk 16 beneath said tumblers, which, being pressed with their bottoms against said disk, will be subjected to the action of the same.

In order to mount on and remove the tumblers from their several holders, it is only necessary to withdraw the bolt 65 out of engagement with the crank 64, whereupon the latter can be turned so as to more or less rotate each frame and the tumblers carried thereby. Before the crank is manipulated it is necessary to first operate the other or smaller crank 63, so that the bar which said last-named crank controls will effectuate the raising of the spindles, and consequently the tumblers into which the cushioned tubes 46 have been forced.

The machine is adapted to effect three distinct operations upon the tumblers—viz., cleaning, cutting, and polishing. These several operations are successively performed by first arranging upon the shaft 11 a disk 16, which is composed of cast-iron, then mounting upon said shaft a disk composed of sandstone, and then mounting upon said shaft a disk composed of felt. In order to remove the superstructure of the machine so as to change the disks, it is only necessary to release the bolts 7, remove the belt-wheel 12, and also release the set-screw 18, whereupon the shaft can be withdrawn from said disk 16. It will probably be more desirable, however, to provide three machines, one having a cast-iron disk, another having a sandstone disk, and the other having a felt disk.

Where it is necessary to use water while the tumblers are being subjected to the action of the disk, the same may be poured on the disk through the radial openings 9 of the plate 5, the overflow from the channel or recess 17 passing into the chamber above the partition 2, from whence it can be drained through any suitable discharge-opening.

Having thus fully described my invention, what I claim as new, and desire to secure by Letters Patent, is—

1. In a machine for dressing the bottoms of glass tumblers or similar vessels, the combination, with a frame and with tumbler-supporting means journaled therein, of an abrading-disk situated in operative contiguity and revoluble in a plane parallel to the bottoms of the tumblers, and means for rotating said disk, the axis of revolution of said tumbler-supporting means being parallel to the disk, substantially as described.

2. In a machine for dressing the bottoms of glass tumblers or similar vessels, the combination, with a frame and with tumbler-supporting means journaled therein, of an abrading-disk situated in operative contiguity and revoluble in a plane parallel to the bottoms of the tumblers, means for rotating said disk and means for individually rotating the tumblers, the axis of revolution of said tumbler-supporting means being parallel to the disk, substantially as described.

3. In a machine for dressing the bottoms of glass tumblers or similar vessels, the combination, with a frame and with tumbler-supporting means journaled therein, of a revoluble shaft having suitable operating means, an abrading-disk carried by said shaft with one of its faces in operative contiguity to the bottoms of the tumblers, and means actuated by said shaft for rotating the individual tumblers, the axis of revolution of said tumbler-supporting means being parallel to the disk, substantially as described.

4. In a machine for dressing the bottoms of glass tumblers or similar vessels, the combination, with a frame, of a shaft having suitable operating means and journaled in said frame, an abrading-disk carried by said shaft, tumbler-carriers journaled in said frame radially with respect to said shaft and in operative contiguity to said disk, and means actuated by said shaft for rotating the individual tumblers in said carriers, the axes of revolution of said tumbler-carriers being radial relatively to the shaft, substantially as described.

5. In a machine for dressing the bottoms of glass tumblers or similar vessels, the combination, with a frame, of a shaft having suitable operating means and journaled in said frame an abrading-disk carried by said shaft, tumbler-carriers journaled in said frame radially with respect to said shaft, tumbler-holders revolubly mounted in said carriers and projecting into operative contiguity to one of the faces of said disk and intermeshing pinions connected to said holders and having an operative engagement with said shaft, the axes of revolution of said tumbler-carriers being radial relatively to the shaft, substantially as described.

6. In a machine for dressing the bottoms of glass tumblers or similar vessels, the combination, with a frame, of a shaft having suitable operating means and journaled in said frame, an abrading-disk carried by said shaft, tumbler-carriers journaled in said frame radially with respect to said shaft, tumbler-holders revolubly mounted in said carriers and projecting into operative contiguity to one of the faces of said disk, intermeshing pinions connected to said holders, a cone-carrying pinion engaging one of said first-named pinions and journaled in each carrier, and a friction-cone mounted in said shaft and engaging the cones of said cone-carrying pinions, the axes of revolution of said tumbler-carriers being radial relatively to the shaft, substantially as described.

7. In a machine for dressing the bottoms of glass tumblers or similar vessels, the combination, with a frame, of a shaft having suitable operating means and journaled in said frame, an abrading-disk carried by said shaft, tumbler-carrying frames radially arranged in said frame with respect to said shaft and journaled at their ends in the frame, their axes of revolution being radial relatively to the shaft, tumbler-holders revolubly mounted in said tumbler-carrying frames and projecting into operative contiguity to one of the faces of said disk, intermeshing pinions connected to said holders, a cone-carrying pinion engaging one of said first-named pinions and journaled in each tumbler-carrying frame, a friction-cone mounted on said shaft and engaging the cones of said cone-carrying pinions, and means for rotating the tumbler-carrying frames, substantially as described.

8. In a machine for dressing the bottoms of glass tumblers or similar vessels, the combination, with a frame, of a shaft having suitable operating means and journaled in said frame, an abrading-disk carried by said shaft, tumbler-carrying frames radially arranged in said frame with respect to said shaft and journaled at their ends in the frame, their axes of revolution being radial relatively to the shaft, tumbler-holders revolubly mounted in said tumbler-carrying frames and projecting into operative contiguity to one of the faces of said disk, lifting means for said holders mounted on said tumbler-carrying frames, intermeshing pinions connected to said holders, a cone-carrying pinion engaging one of said first-named pinions and journaled in each tumbler-carrying frame, a friction-cone mounted on said shaft and engaging the cones of said cone-carrying pinion, and means for rotating the tumbler-carrying frames, substantially as described.

9. In a machine for dressing the bottoms of glass tumblers or similar vessels, the combination, with a frame, of a shaft having suitable operating means and journaled in said frame, an abrading-disk carried by said shaft, tumbler-carrying frames radially arranged in said frame with respect to said shaft and journaled at their ends in the frame, means for longitudinally adjusting said tumbler-carrying frames, tumbler-holders revolubly mounted in said tumbler-carrying frames and projecting into operative contiguity to one of the faces of said disk, lifting means for said holders mounted on said tumbler-carrying frames, intermeshing pinions connected to said holders, a cone-carrying pinion engaging one of said first-named pinions and journaled in each tumbler-carrying frame, a friction-cone mounted on said shaft and engaging the cones of said cone-carrying pinion, and a crank mounted on the end of each tumbler-carrying frame and provided with suitable locking means, substantially as described.

10. In a machine for dressing the bottoms of glass tumblers or similar vessels, a holder for the tumblers consisting of a sleeve adapted to be revolubly mounted in said machine, a tube projecting into and longitudinally movable with respect to said sleeve, guiding means for said tube carried by said sleeve, an annularly-cushioned block mounted on the lower end of said tube, an annularly-cushioned ring surrounding said tube and adjustably mounted thereon, a spindle penetrating said sleeve and the tube, being guided in the former at one end and connected to the block at its other end, and a spiral spring surrounding the spindle and disposed between said block and a portion of the sleeve, substantially as described.

In testimony that I claim the foregoing I have hereunto set my hand this 5th day of December, 1898.

JEAN BAPTISTE FONDU.

Witnesses:
J. P. H. POHLER,
GREGORY PHELAN.